US008654102B2

(12) United States Patent
Chuang et al.

(10) Patent No.: US 8,654,102 B2
(45) Date of Patent: Feb. 18, 2014

(54) OPTICAL TOUCH SYSTEM

(75) Inventors: Keng-Han Chuang, Hsinchu (TW); Kuo-Chiang Lin, Hsinchu (TW); Ching-Lun Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 530 days.

(21) Appl. No.: 12/874,419

(22) Filed: Sep. 2, 2010

(65) Prior Publication Data

US 2011/0090177 A1    Apr. 21, 2011

(30) Foreign Application Priority Data

Oct. 20, 2009 (TW) .............................. 98135460 A (51) Int. Cl.
*G06F 3/042* (2006.01)
*G09G 5/00* (2006.01)

(52) U.S. Cl.
USPC .......................................... 345/175; 345/207

(58) Field of Classification Search
USPC .......... 345/690, 204, 156, 207, 158, 175, 420
See application file for complete search history.

(56) References Cited

U.S. PATENT DOCUMENTS

2001/0022581 A1* 9/2001 Koyama et al. ............... 345/204
2003/0210257 A1* 11/2003 Hudson et al. ................ 345/692

FOREIGN PATENT DOCUMENTS

| TW | 200612127 | * | 4/2006 | .............. G02F 1/13 |
|---|---|---|---|---|
| TW | 200841226 | | 10/2008 | |
| TW | M355612 | | 5/2009 | |
| TW | M357653 | | 5/2009 | |
| TW | M359744 | | 6/2009 | |

OTHER PUBLICATIONS

"Office Action of Taiwan Counterpart Application" with English translation thereof, issued on Feb. 6, 2013, p. 1-p. 11.

* cited by examiner

*Primary Examiner* — Michael Faragalla
(74) *Attorney, Agent, or Firm* — J.C. Patents (57) ABSTRACT

An optical touch system includes a non-visible light source, a screen, a first and second polarizing elements, and an optical detector. The non-visible light source emits a non-visible beam. A part of the non-visible beam passes through the screen disposed in a light path of the non-visible beam. The touch object reflects the part of the non-visible beam into an object beam when a touch object approaches or touches the screen, and the object beam passes through the screen. The first polarizing element is disposed in the light path of the non-visible beam and between the non-visible light source and the screen. The optical detector is disposed in a light path of the object beam, and senses the object beam. The second polarizing element is disposed in the light path of the object beam passing through the screen and between the screen and the optical detector.

17 Claims, 7 Drawing Sheets

OPTICAL TOUCH SYSTEM

CROSS-REFERENCE TO RELATED APPLICATION

This application claims the priority benefit of Taiwan application serial no. 98135460, filed on Oct. 20, 2009. The entirety of the above-mentioned patent application is hereby incorporated by reference herein and made a part of this specification.

BACKGROUND OF THE INVENTION

1. Field of the Invention

The invention relates to an optical system, and more particularly, to an optical touch system.

2. Description of Related Art

In the conventional touch rear projection system, an infrared beam irradiates on a transparent screen by an infrared light emitting diode (IR-LED). When a finger or a tip of a touch pen touches the screen, the infrared beam is reflected to an image detector. Through the infrared image sensed by the image detector, the control unit electrically connected to the image detector may determine the position of the finger or the tip of the touch pen relative to the screen.

Because the IR-LED and the image detector are disposed at the same side of the screen, generally, at least one ray of the infrared beam emitted by the IR-LED may not pass through the screen, and the ray is reflected to the image detector by a surface of the screen. Because the ray reflected by the screen follows law of reflection, i.e. the incident angle of the ray striking the screen is equal to the emergence angle of the ray leaving the screen, the ray has a certain intensity, and forms an over exposed hot spot on the image detector.

In this manner, whether the position on the screen irradiated by the light is touched by the finger or the tip of the touch pen or not, the hot spot exists in the corresponding position on the image detector. So that the control unit may be unable to determine whether the position is touched by the finger or the tip of the touch pen.

In order to solve this issue, in the conventional touch rear projection system, the infrared beam emitted by the IR-LED is emitted to the screen by a larger angle, so that the light of the infrared beam reflected by the screen and following law of reflection may not enter the image detector. However, the volume of the touch rear projection system may become larger. Furthermore, because the over large incident angle of the infrared beam may cause the insufficient illumination, a plurality of IR-LEDs or an IR-LED capable of outputting higher energy may be adopted, and waste energy. Moreover, adopting too more IR-LEDs also correspondingly increases the number of the image detector, thereby increasing the number of the image capture lens of the image detector, and thus, enhancing the cost.

Besides, Taiwan patent no. M355612 discloses an infrared light source, an infrared image capture lens, a screen, a reflection unit, and a reflecting mirror.

SUMMARY OF THE INVENTION

An embodiment of the invention provides an optical touch system capable of effectively enhancing the accuracy of determining the touch position.

Other objects and advantages of the invention may be further understood by referring to the technical features broadly embodied and described as follows.

An embodiment of the invention provides an optical touch system capable of sensing the position of a touch object. The optical touch system includes a non-visible light source, a screen, a first polarizing element, an optical detector, and a second polarizing element. The non-visible light source is capable of emitting a non-visible beam. The screen is disposed in a light path of the non-visible beam, wherein a part of the non-visible beam is capable of passing through the screen. The touch object reflects the part of the non-visible beam passing through the screen into an object beam when the touch object approaches or touches the screen, and the object beam passes through the screen. The first polarizing element is disposed in the light path of the non-visible beam and located between the non-visible light source and the screen. The optical detector is disposed in a light path of the object beam passing through the screen and capable of sensing the object beam. The second polarizing element is disposed in the light path of the object beam passing through the screen and located between the screen and the optical detector.

In the embodiment of the invention, because the second polarizing element is capable of blocking a part of the non-visible beam causing the hot spot from the first polarizing element, the determination of the optical touch system for the position of the touch object is not affected by the hot spots, so that it may effectively enhance the accuracy of the optical touch system for determining the touch position.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
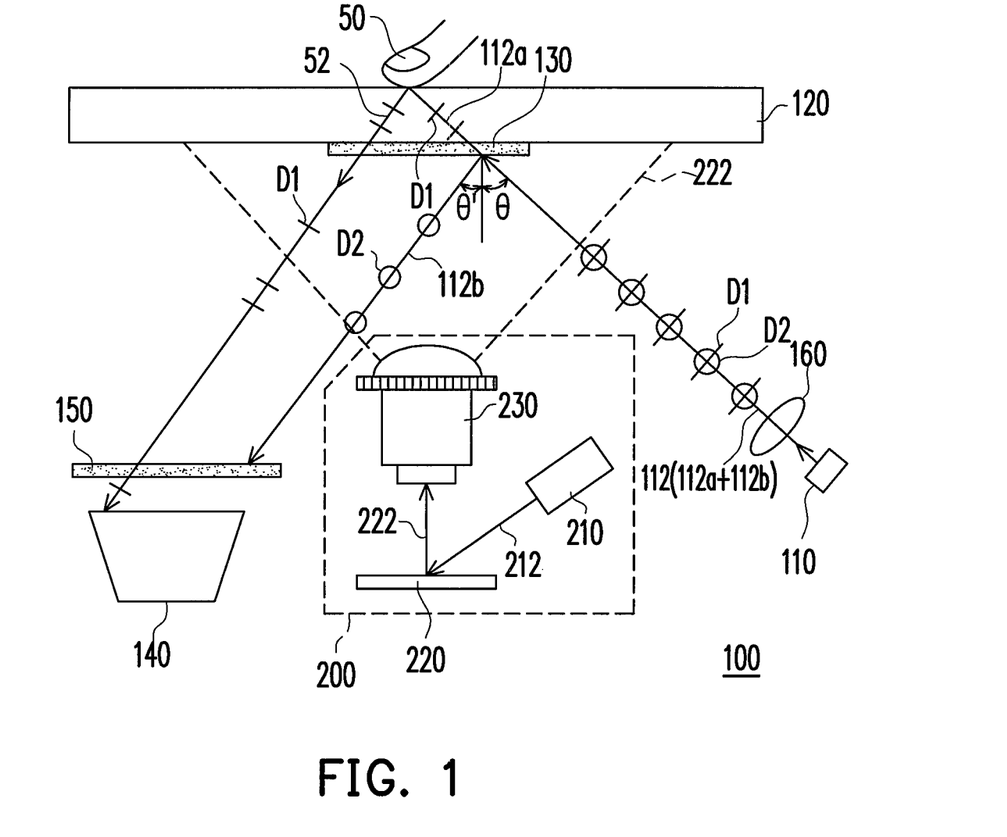
FIG. 1 is a schematic structure diagram of an optical touch system according to an embodiment of the invention.

Referring to FIG. 1, the optical touch system 100 of the embodiment is capable of sensing the position of a touch object 50. The touch object 50 is a user's finger, a tip of a touch pen, or other objects. The optical touch system 100 includes a non-visible light source 110, a screen 120, a first polarizing element 130, an optical detector 140, and a second polarizing element 150. The non-visible light source 110 is capable of emitting a non-visible beam 112. In the embodiment, the non-visible beam 112 is an infrared (IR) beam. The non-visible light source 110 is a light emitting diode (LED), more particularly the non-visible light source 110 is an infrared light emitting diode (IR-LED). Furthermore, in the embodiment, a lens 160 may be disposed in front of the non-visible light source 110, and the lens 160 is located in the light path of the non-visible beam 112. The screen 120 is disposed in the light path of the non-visible beam 112, wherein a part of the non-visible beam 112 is capable of passing through the screen 120.

The touch object 50 reflects the part of the non-visible beam 112 passing through the screen 50 into an object beam 52 when the touch object 50 approaches or touches the screen 120, and the object beam 52 passes through the screen 120. The optical detector 140 is disposed in the light path of the object beam 52 passing through the screen 120 and capable of sensing the object beam 52. The optical detector 140 includes a charge coupled device (CCD) or a complementary metal oxide semiconductor (CMOS) sensor. In the embodiment, the optical detector 140, for example, is an infrared (IR) camera. The optical touch system may determine the position of the touch object 50 relative to the screen 120 through the non-visible light image formed by the object beam 52 sensed by the optical detector 140.

The first polarizing element 130 is disposed in the light path of the non-visible beam 112 and located between the non-visible light source 110 and the screen 120. The first polarizing element 130, for example, is a dual brightness enhancement film (DBEF), a polarizer, or a polarizing beam splitter (PBS). The second polarizing element 150 is disposed in the light path of the object beam 52 passing through the screen 120 and located between the screen 120 and the optical detector 140. The second polarizing element 150, for example, is a DBEF, a polarizer, or a PBS.

The first polarizing element 130 is capable of being passed through by a first part beam 112a of the non-visible beam 112 having a first polarization direction D1, and capable of blocking a second part beam 112b of the non-visible beam 112 having a second polarization direction D2. In the embodiment, the first polarization direction D1 is substantially perpendicular to the second polarization direction D2. For example, the first polarization direction D1 is a P polarization direction, and the second polarization direction D2 is an S polarization direction. However, in other embodiments, the first polarization direction D1 is the S polarization direction, and the second polarization direction D2 is the P polarization direction. In the embodiment, the first polarizing element 130 is disposed on the screen 120. The first part beam 112a is capable of being reflected into the object beam 52 by the touch object 50, and the object beam 52 has the first polarization direction D1. The second polarizing element 150 is capable of being passed through by the object beam 52 having the first polarization direction D1. For example, the transmissive axis of the second polarizing element 150 is rotated to the direction capable of being passed through by the P polarization direction light. In this manner, the image of the touch object 50 may be formed on the optical detector 140. The first polarizing element 130 is capable of reflecting the second part beam 112b having the second polarization direction D2 to the second polarizing element 150, and the second polarizing element 150 is capable of blocking the second part beam 112b having the second polarization direction D2. In the embodiment, an emergent angle θ' of the at least one ray of the second part beam 112b leaving the first polarizing element 130 is substantially equal to an incident angle θ of the at least one ray of the non-visible beam 112 striking the first polarizing element 130.

When the first polarizing element 130 is not disposed on the screen 120, at least one ray of the non-visible beam 112 is easily reflected to the optical detector 140 in a manner complying with law of reflection, and an over exposed hot spot is formed on the image detected by the optical detector 140, thereby interfering the accuracy of the optical touch system 100 for determining the position of the touch object 50. For the first polarizing element 130 and the second polarizing element 150 are used in the optical touch system 100 of the embodiment, the polarization direction of the non-visible beam 112 originally formed the over exposed hot spot becomes the second polarization direction D2. That is, the first polarizing element 130 reflects the second part beam 112b of the non-visible beam 112 having the second polarization direction D2 to the second polarizing element 150, and the second polarizing element 150 blocks the second part beam 112b having the second polarization direction D2. In this manner, the over exposed hot spot is not formed on the optical detector 140. Accordingly, the determination of the optical touch system 100 for the position of the touch object 50 is not be affected by the hot spot, so that the accuracy of the optical touch system 100 for determining the position of the touch object 50 is effectively enhanced. Furthermore, in the optical touch system 100 of the embodiment, the non-visible beam 112 may be avoid striking the screen 120 by an over large angle. Accordingly, the optical touch system 100 has a smaller volume and a higher light efficiency.

In the embodiment, the optical touch system 100 further includes an optical engine 200. Specifically, the optical engine 200 includes an illumination system 210 and a light valve 220. The illumination system 210 is capable of providing an illumination beam 212. In the embodiment, the illumination beam 212, for example, is a visible beam. The light valve 220 is disposed on the light path of the illumination beam 212, and is capable of converting the illumination beam 212 into an image beam 222. In the embodiment, the light valve 220, for example, is a digital micro-mirror device (DMD). However, in other embodiments, the light valve 220 may be a liquid-crystal-on-silicon panel (LCOS panel) or a transmissive liquid crystal panel. The image beam 222 is capable of passing through the screen 120 to form an image frame. In the embodiment, the screen 120 may have a diffusion structure or a light diffusion surface to form the image frame on the screen 120. Furthermore, in the embodiment, the optical engine 200 further includes a projection lens 230 disposed in the light path of the image beam 222, so as to project the image beam 222 to the screen 120. In other words, the optical touch system 100 of the embodiment may be a rear projection touch system having the functions of display and touch.

It should be noted that, in the embodiment, the first polarizing element 130 may be disposed on a partial surface of the screen 120 to save the usage of materials. However, in other embodiments, the first polarizing element 130 may be disposed over the entire surface of the screen 120 to enhance the uniformity of image brightness detected by the optical detector 140.

Figure 2:
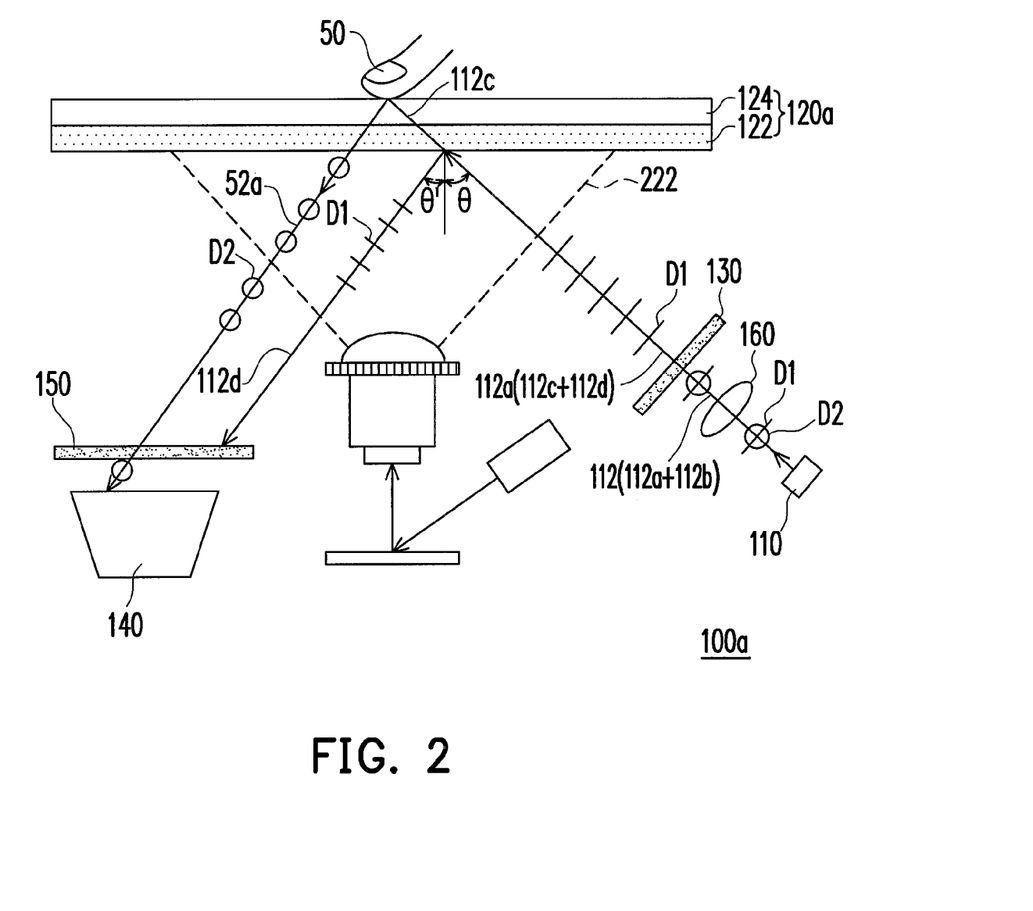
FIG. 2 is a schematic structure diagram of an optical touch system according to another embodiment of the invention.

Referring to FIG. 2, the optical touch system 100a of the embodiment is similar to the optical touch system 100 in FIG. 1, and the difference between the two systems is described as follows. In the embodiment, the first polarizing element 130 is disposed in front of the non-visible light source 110 instead of disposed on the screen 120a. Moreover, the optical touch system 100a of the embodiment further includes a wave plate 122. Furthermore, in the embodiment, the screen 120a further includes a light transmissive plate 124 disposed on the wave plate 122 and located in the light path of the object beam 52a. Besides, the wave plate 122 is disposed between the light transmissive plate 124 and the optical detector 140. In the embodiment, a part of non-visible beam 112 (i.e. a third part beam 122c) is capable of passing through the wave plate 122 and the light transmissive plate 124, and another part of non-visible beam 112 (i.e. a fourth part beam 122d) is capable of being reflected to the second polarizing element 150 by the wave plate 122.

In the embodiment, the wave plate 122, for example, is a quarter wave plate. Accordingly, when the third part beam 122c passes through the wave plate 122, the third part beam 122c is converted to a circular polarized beam, and the touch object 50 is capable of reflecting the circular polarized beam into an object beam 52a. When the object beam 52a reflected by the touch object 50 passes through the wave plate 122, the polarization direction of the object beam 52a is converted to the second polarization direction D2. The second polarizing element 150 is capable of being passed through by the object beam 52a having the second polarization direction D2 and capable of blocking the non-visible beam 112 reflected by wave plate 122 and having the first polarization direction D1 (i.e. the fourth part beam 122d). For example, the transmissive axis of the second polarizing element 150 is rotated to the direction capable of being passed through by the S polarization direction light so as to achieve the above effect.

In the embodiment, an emergent angle θ' of the at least one ray of another part of the non-visible beam 112 reflected by the wave plate 122 (i.e. the fourth part beam 122d) leaving the wave plate 122 is substantially equal to an incident angle θ of the at least one ray of the non-visible beam 112 entering into the wave plate 122.

Because the first polarizing element 130, the second polarizing element 150, and the wave plate 122 are used in the optical touch system 100a of the embodiment, the non-visible beam 112 having the first polarization direction D1 originally formed the over exposed hot spot is blocked by the second polarizing element 150, and the polarization direction of the object beam 52a is converted into the second polarization direction D2, so that the object beam 52a may pass through the second polarizing element 150, and is transmitted to the optical detector 140. In this manner, the over exposed hot spot is not formed on the optical detector 140. Accordingly, the determination of the optical touch system 100a for the position of the touch object 50 is not be affected by the hot spot, so that the accuracy of the optical touch system 100a for determining the position of the touch object 50 is effectively enhanced.

Figure 3:
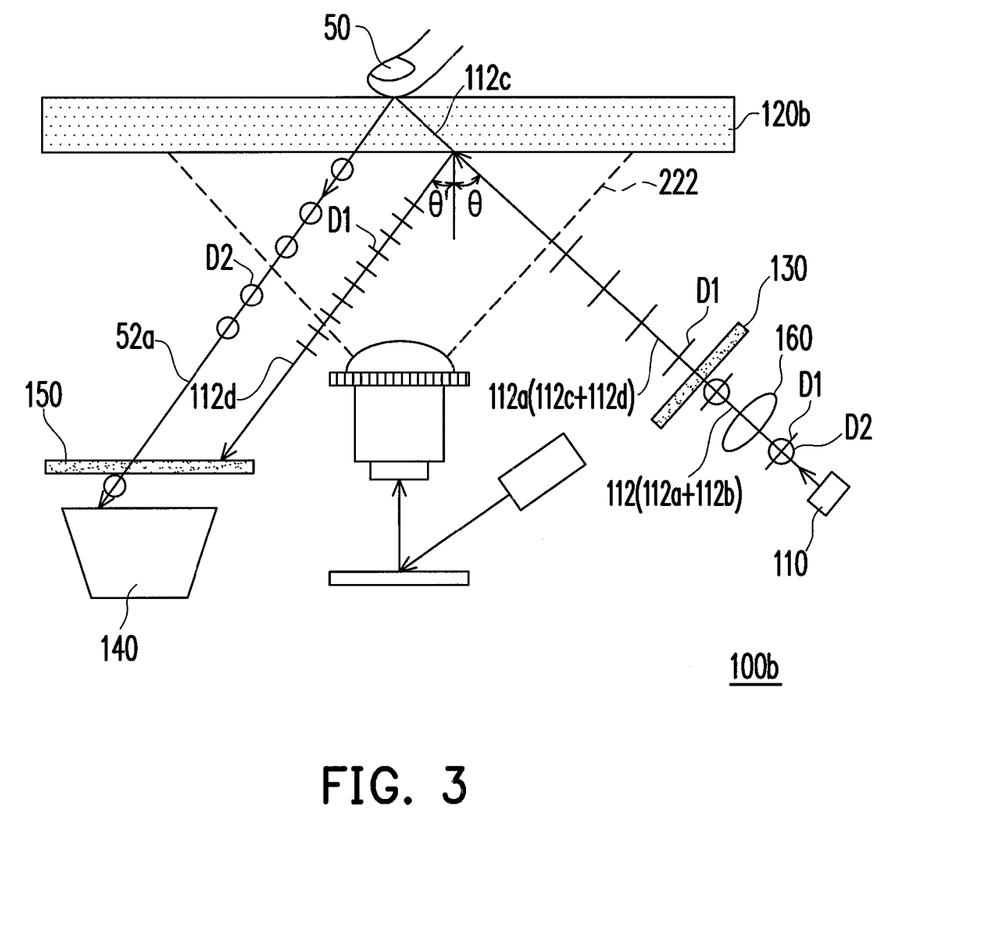
FIG. 3 is a schematic structure diagram of an optical touch system according to another embodiment of the invention.

Referring to FIG. 3, the optical touch system 100b of the embodiment is similar to the optical touch system 100a in FIG. 2, and the difference between the two systems is described as follows. In the embodiment, the screen 120b is a wave plate (e.g. a quarter wave plate), and may unnecessarily include another light transmissive plate. In other words, the wave plate 122 and the light transmissive plate 124 in FIG. 2 are combined as a signal wave plate (i.e. the screen 120b) in the embodiment.

In order to make the polarizing elements 130 and 150 have the better light splitting capability, a polarizer, such as a DBEF or a PBS, having the transmittance lower than 20% for the light with 850 nm wavelength in the reflection state may be selected to serve as the polarizing elements 130 and 150 in the embodiments of FIG. 1, FIG. 2, and FIG. 3. Herein, the reflection state represents the state where the transmissive axis of the polarizing element is perpendicular to the polarization direction of the linear polarized beam, and the passing state of the polarizing elements 130 and 150 represents the state where the transmissive axis of the polarizing element is parallel to the polarization direction of the entering linear polarized beam.

Figure 4:
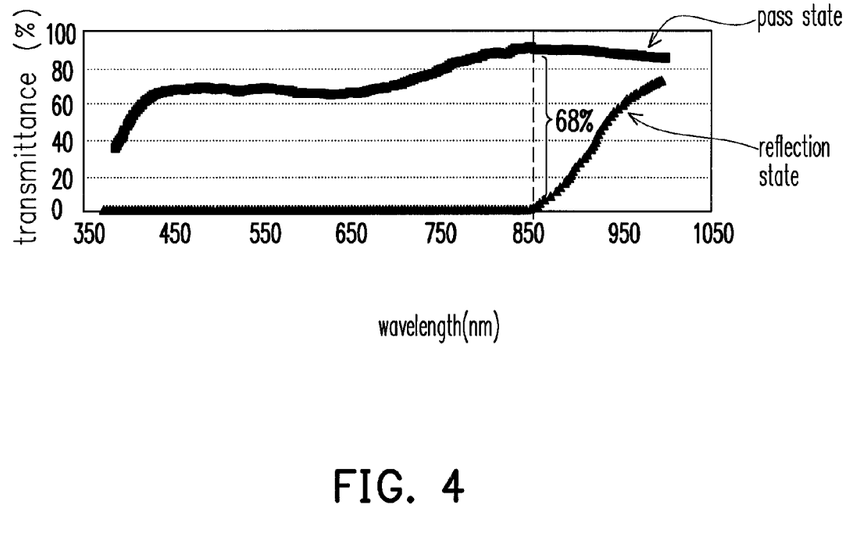
FIG. 4 shows transmittance curves of the polarizing element in the reflection state and the passing state.

Referring to FIG. 4, the polarizer with the model KOKI SPF-30C-32 of the SIGMA Company is used herein. As shown in FIG. 4, for the light with 850 nm wavelength, the transmittance of the polarizer in the passing state is higher than the transmittance of the polarizer in the reflection state by 86%. Accordingly, the polarizer having the characteristic shown in FIG. 4 may serve as the polarizing elements 130 and 150 in the embodiments of FIG. 1, FIG. 2, and FIG. 3 to achieve a good light splitting capability.

Figure 5:
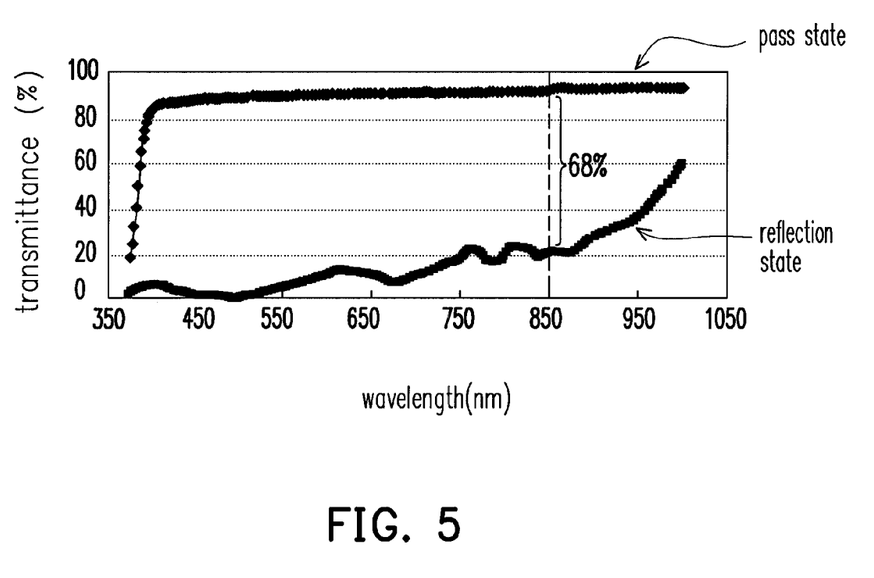
FIG. 5 shows transmittance curves of the dual brightness enhancement film (DBEF) in the reflection state and the passing state.

Referring to FIG. 5, the DBEF D2 400 of the Minnesota Mining and Manufacturing (3M) Company is used herein. As shown in FIG. 5, for the light with 850 nm wavelength, the transmittance of the DBEF in the passing state is higher than the transmittance of the DBEF in the reflection state by 68%. Accordingly, the DBEF having the characteristic shown in FIG. 5 may serve as the polarizing elements 130 and 150 in the embodiments of FIG. 1, FIG. 2, and FIG. 3 to achieve a good light splitting capability.

Figure 6:
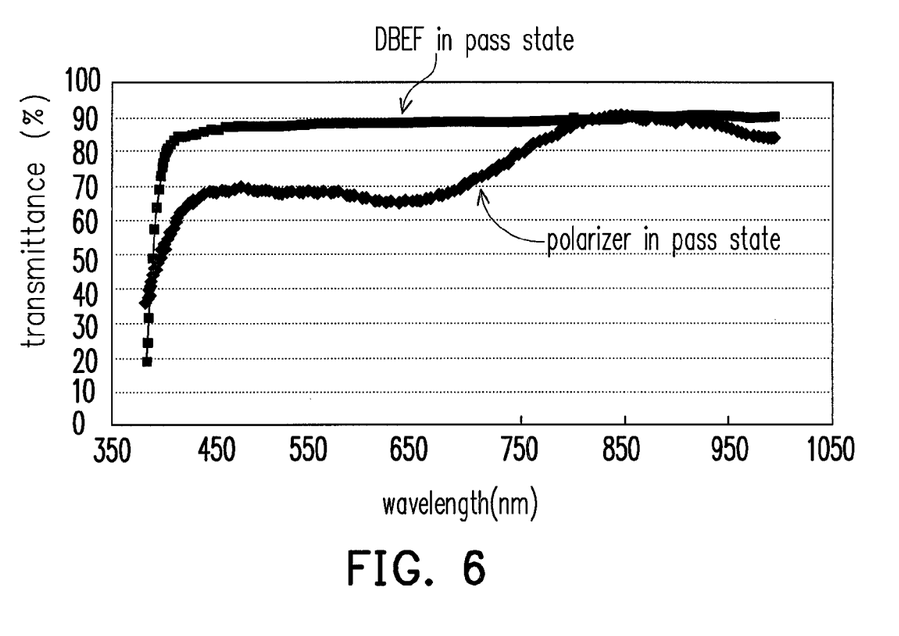
FIG. 6 shows the transmittance comparison of the polarizer of FIG. 4 and the DBEF of FIG. 5 in the passing state.
Figure 7:
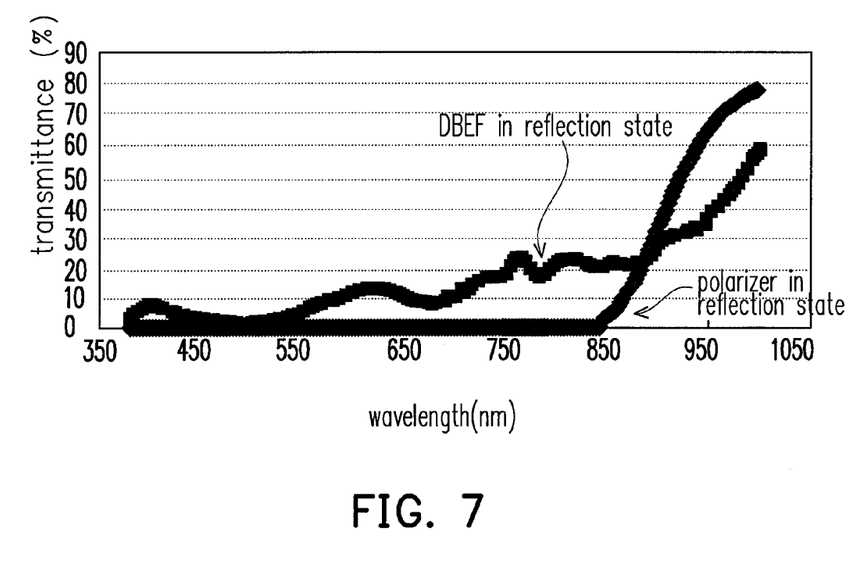
FIG. 7 shows the transmittance comparison of the polarizer of FIG. 4 and the DBEF of FIG. 5 in the reflection state.

As shown in FIG. 6 and FIG. 7, the transmittance curves of the polarizer and the DBEF are different. However, both of the polarizer and the DBEF have the good light splitting capability for the light with 850 nm wavelength. Accordingly, the polarizer and the DBEF may serve as the polarizing elements 130 and 150 in the embodiments of FIG. 1, FIG. 2, and FIG. 3.

To sum up, the embodiment or the embodiments of the invention may have at least one of the following advantages. In the embodiment, for the second polarizing element is adopted to block a part of the non-visible beam from the first polarizing element which causes hot spots, the determination of the optical touch system for the position of the touch object is not affected by the hot spots, so that the optical touch system may effectively enhance the accuracy for determining the position of the touch object. Furthermore, in the configuration of the optical touch system according to the embodiment of the invention, the non-visible beam may be avoid striking the screen by an over large angle. Accordingly, the optical touch system has a smaller volume and a higher light efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical touch system, capable of sensing a position of a touch object, the optical touch system comprising:
   a non-visible light source capable of emitting a non-visible beam, wherein the non-visible beam is an infrared beam;
   a screen disposed in a light path of the non-visible beam, wherein a part of the non-visible beam is capable of passing through the screen, the touch object reflects the part of the non-visible beam passing through the screen into an object beam when the touch object approaches or touches the screen, and the object beam passes through the screen;
   a first polarizing element disposed in the light path of the non-visible beam and located between the non-visible light source and the screen;
   an optical detector disposed in a light path of the object beam passing through the screen and capable of sensing the object beam; and
   a second polarizing element disposed in the light path of the object beam passing through the screen and located between the screen and the optical detector, wherein the first polarizing element is capable of being passed through by a first part beam of the non-visible beam having a first polarization direction and capable of blocking a second part beam of the non-visible beam having a second polarization direction, and
   wherein the screen further comprises a wave plate, the part of the non-visible beam is capable of passing through the wave plate, and another part of the non-visible beam is capable of being reflected to the second polarizing element, a polarization direction of the object beam is converted to the second polarization direction when the object beam reflected by the touch object passes through the wave plate, the second polarizing element is capable of being passed through by the object beam having the second polarization direction and capable of blocking the non-visible beam reflected by the wave plate and having the first polarization direction.

2. An optical touch system, capable of sensing a position of a touch object, the optical touch system comprising:
   a non-visible light source capable of emitting a non-visible beam, wherein the non-visible beam is an infrared beam;
   a screen disposed in a light path of the non-visible beam;
   a first polarizing element disposed in the light path of the non-visible beam and located between the non-visible light source and the screen, wherein the first polarizing element is disposed on the screen, the first polarizing element is capable of being passed through by a first part beam of the non-visible beam having a first polarization direction and capable of blocking a second part beam of the non-visible beam having a second polarization direction, wherein the touch object reflects the first part beam of the non-visible beam passing through the screen into an object beam when the touch object approaches or touches the screen;
   an optical detector disposed in a light path of the object beam passing through the screen and capable of sensing the object beam; and
   a second polarizing element disposed in the light path of the object beam passing through the screen and located between the screen and the optical detector,
   wherein the object beam has the first polarization direction, the second polarizing element is capable of being passed through by the object beam having the first polarization direction, the first polarizing element is capable of reflecting the second part beam of the non-visible beam to the second polarizing element, and the second polarizing element is capable of blocking the second part beam of the non-visible beam having the second polarization direction.

3. The optical touch system as claimed in claim 2, wherein an emergent angle of at least one ray of the second part beam leaving the first polarizing element is substantially equal to an incident angle of at least one ray of the non-visible beam striking the first polarizing element.

4. The optical touch system as claimed in claim 2, wherein the first polarizing element is disposed on a partial surface of the screen.

5. The optical touch system as claimed in claim 1, wherein an emergent angle of at least one ray of the another part of the non-visible beam reflected by the wave plate and leaving the wave plate is substantially equal to an incident angle of at least one ray of the non-visible beam striking the wave plate.

6. The optical touch system as claimed in claim 1, wherein the wave plate is a quarter wave plate.

7. The optical touch system as claimed in claim 1, wherein the screen further comprises a light transmissive plate disposed on the wave plate and located in the light path of the object beam, and the wave plate is disposed between the light transmissive plate and the optical detector.

8. The optical touch system as claimed in claim 1, wherein the first polarization direction is substantially perpendicular to the second polarization direction.

9. The optical touch system as claimed in claim 1, wherein the first polarizing element comprises a dual brightness enhancement film, a polarizer, or a polarizing beam splitter.

10. The optical touch system as claimed in claim 1, wherein the second polarizing element comprises a dual brightness enhancement film, a polarizer, or a polarizing beam splitter.

11. The optical touch system as claimed in claim 1, further comprising:
   an illumination system capable of providing an illumination beam; and
   a light valve disposed in a light path of the illumination beam and capable of converting the illumination beam into an image beam, the image beam being capable of passing through the screen to form an image frame.

12. The optical touch system as claimed in claim 1, wherein the non-visible light source is a light emitting diode.

13. The optical touch system as claimed in claim 1, wherein the optical detector comprises a charge-coupled device or a complementary metal-oxide semiconductor (CMOS) image sensor.

14. The optical touch system as claimed in claim 2, wherein the first polarizing element and the second polarizing element respectively comprise a dual brightness enhancement film, a polarizer, or a polarizing beam splitter.

15. The optical touch system as claimed in claim 2, further comprising:
   an illumination system capable of providing an illumination beam; and
   a light valve disposed in a light path of the illumination beam and capable of converting the illumination beam into an image beam, the image beam being capable of passing through the screen to form an image frame.

16. The optical touch system as claimed in claim 2, wherein the non-visible light source is a light emitting diode.

17. The optical touch system as claimed in claim 2, wherein the optical detector comprises a charge-coupled device or a complementary metal-oxide semiconductor (CMOS) image sensor.

* * * * *